United States Patent [19]

Hart

[11] 3,983,844

[45] Oct. 5, 1976

[54] POULTRY WATERING DEVICE

[75] Inventor: Harold W. Hart, Glendale, Calif.

[73] Assignee: H. W. Hart Mfg. Co., Glendale, Calif.

[22] Filed: Mar. 28, 1974

[21] Appl. No.: 455,547

[52] U.S. Cl. .............................. 119/75; 24/257 R
[51] Int. Cl.² .......................................... A01K 7/00
[58] Field of Search ................... 119/75, 72.5, 74; 24/257 R, 129 R, 129 D, 255 C

[56] References Cited
UNITED STATES PATENTS

| 341,356 | 5/1886 | Spencer | 119/75 |
|---|---|---|---|
| 2,539,785 | 1/1951 | Klinzing | 119/75 |
| 2,585,547 | 2/1952 | Harmon | 119/75 |
| 2,845,046 | 7/1958 | Hart | 119/75 |
| 3,118,426 | 1/1964 | Ealet | 119/75 |
| 3,144,853 | 8/1964 | Blough | 119/75 |
| 3,357,406 | 12/1967 | Robinson | 119/75 X |
| 3,802,395 | 4/1974 | von Taschitzki | 119/75 |
| 3,807,675 | 4/1974 | Seckerson et al. | 24/257 R |

Primary Examiner—J.N. Eskovitz
Attorney, Agent, or Firm—Ellsworth R. Roston

[57] ABSTRACT

A poultry drinking cup having a cup body with an inlet opening, valve means, and a trigger in operative engagement with the valve means. Shielding means are positioned to shield the trigger movement from interference by dirt or debris. With the trigger rotatably mounted in a recess in the cup body, the shielding means may be mounted above the recess. The trigger may include a water finger positioned within an opening through the trigger to conduct water through the opening to a receptacle in the trigger. A resilient clamp member may be connected to the cup body to fit about a pipe leading to the cup for supporting the cup with respect to the pipe.

29 Claims, 12 Drawing Figures

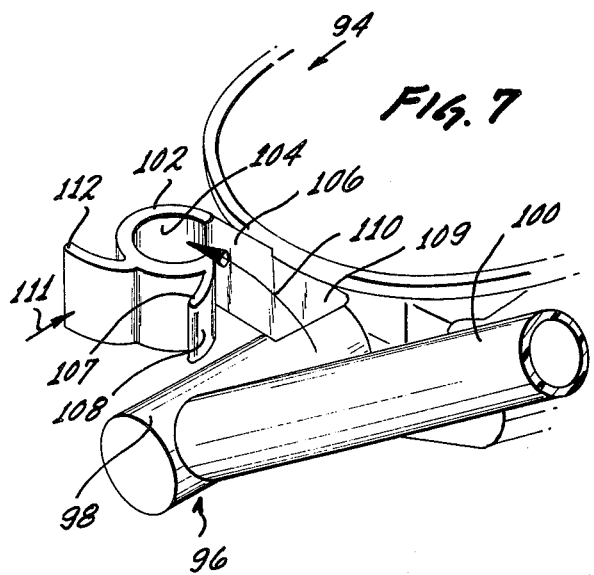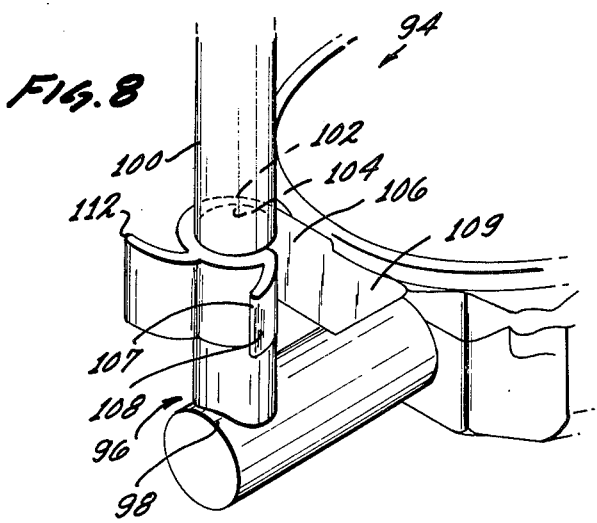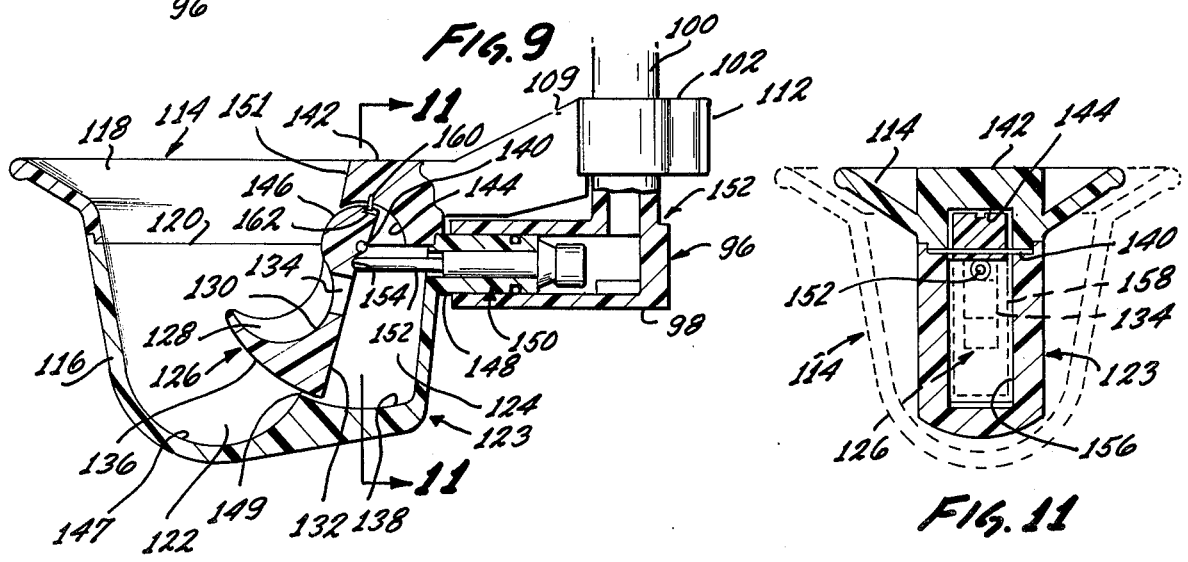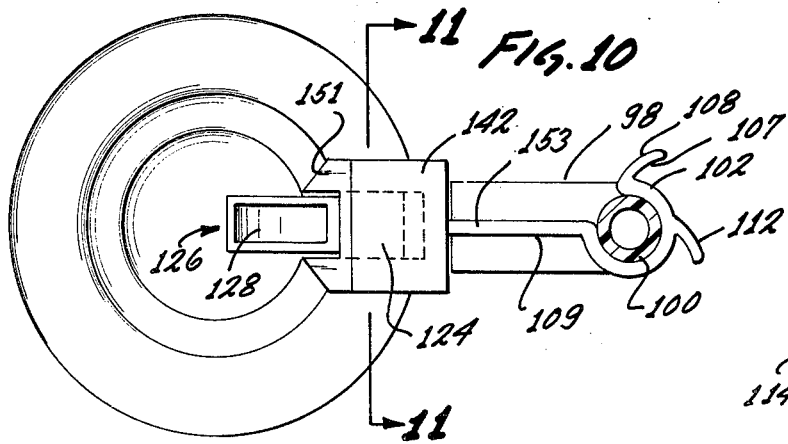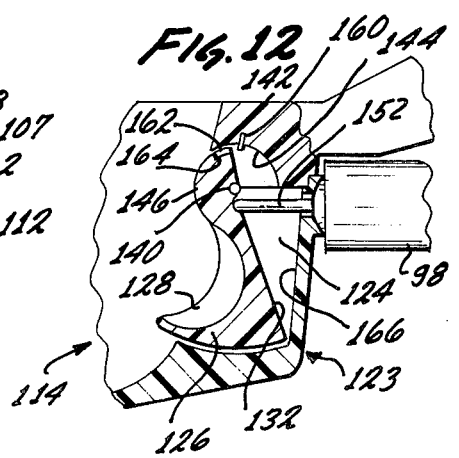

POULTRY WATERING DEVICE

BACKGROUND OF THE INVENTION

Poultry provide a very important food source in the form of eggs and meat. Foro the production of eggs, the poultry are commonly housed in cages. However, poultry which are raised for meat production are generally free to move about at ground level.

The raising of poultry for meat production generally takes place over an 8 or 9 week cycle in which the poultry begin the cycle as small chicks and end the cycle as young birds. Prior to the introduction of the small chicks into the poultry house at the beginning of a cycle, particulate material such as sawdust or soy bean hulls is generally laid down on the floor of the poultry house to absorb the droppings during the growing cycle. Then, after slaughter of the poultry at the end of the cycle, all or a portion of the floor covering is removed and replaced with a new covering for the start of the next cycle.

During the growing cycle, the poultry are watered and fed within the poultry house. In modern poultry raising, this is accomplished by use of a mechanical feeder and the use of individual watering devices which are positioned throughout the poultry house near the floor level. The watering devices are generally in the form of poultry drinking cups with each of the cups being connected through a water feed line fitting to a main water line. Each of the cups is, thereby, individually supplied with water with each cup serving the water needs for a relatively small number of birds.

Each poultry drinking cup is generally supplied with a valve means to control the flow of water into the cup with the valve means being preferably actuatable by the poultry. Thus, for example, each cup may contain a trigger whose movement controls the position of the valve means and the flow of water into the cup.

After a time, poultry which are watered with a drinking cup learn how to operate the cup by pecking at the trigger. The cup, thus, provides a source of water which is available on demand by the poultry. Since a single cup will only supply the water needs of a limited number of birds, the leakage of water from a single cup does not pose serious problems as would the leakage of water from an obstructed drinking trough used to supply the water needs of a relatively large number of birds.

A single poultry house may contain literally thousands of poultry drinking cups which are connected by water feed lines or fittings to a main water line. With poultry raised at ground level, as is generally the case in meat production, the ground coverings used in a poultry house provide a source of debris which may cause frequent clogging of the drinking cups.

There is no drinking cup presently available which may be used at floor level without becoming clogged after a relatively short period of time by solid debris which may be transferred to the cups by the poultry during drinking. Solid debris interferes with the movement of the trigger and the valve mechanism with the result that the valve mechanism or trigger may become stuck in an open position. With the valve mechanism or trigger stuck in an open position, a continuous flow of water will be supplied to the drinking cup which will cause the cup to overflow. In addition to wasting water, drinking cups which overflow are a problem because they create unsanitary conditions in the poultry house. For example, water which spills onto the floor may interact with the poultry droppings to promote the formation of ammonia which is irritating to the poultry and also to personnel working in the poultry house.

When the valve mechanism or trigger becomes stuck in a closed position, no water will be supplied to the drinking cup. Thus, as long as the trigger or valve mechanism remains clogged, the drinking cup will not function and will not supply the needs of poultry in the immediate area.

SUMMARY OF THE INVENTION

The present invention pertains to a poultry drinking cup which is particularly suitable for usage near floor level without clogging of the trigger or valve mechanism by debris which may be deposited in the cup by the birds. The poultry drinking cup of the invention includes a cup body having an inlet opening and means to connect the inlet opening to a water source. Valve means are positioned with respect to the inlet opening to control the flow of water into the cup body and a trigger is rotatably positioned within the cup body in operative engagement with the valve means.

Movement of the trigger, thus, provides movement of the valve means by admitting water into the drinking cup on demand by the poultry. Shielding means are positioned above a portion of the trigger with the shielding means being shaped and positioned to shield the trigger movement and valve mechanism from interference by dirt and debris.

The valve means employed in the drinking cup may include a movable valve stem with the stem having an inner end which contacts the trigger. The shielding means may then be positioned in overlying relation to the valve stem and the point of contact between the valve stem and the trigger.

The trigger may be rotatably mounted within the cup body through a mounting member carried by the trigger which engages a mounting positioned within the cup body. To position the trigger within the cup body with respect to side movement, the mounting member may have a length which properly positions the trigger between the sides of the cup body.

To prevent interference with the trigger movement by debris which falls into the cup body, the cup body may include a low point which is positioned forwardly of the trigger. Dirt or debris which falls into the cup body may, thus, be collected at the low point out of the path of the trigger movement. As a result, dirt or debris within the cup body does not interfere with the trigger movement and, also, dirt or debris may be readily removed from the cup body by a workman without contacting the trigger.

In providing for the flow of water into the cup body, the trigger may include a back surface which contacts a valve stem, and a water receptacle formed in the front surface of the trigger. An opening may be provided through the trigger to form a passage between the back surface of the trigger and the water receptacle. Water which is conveyed to the trigger by flow along the surface of the valve stem may, thus, be conducted through the opening in the trigger into the receptacle in the front surface of the trigger.

To assist the flow of water through a passage to the water receptacle on the front surface of the trigger, a water finger may be positioned within the opening and the outer projections of the finger may extend beyond the front and back surfaces of the trigger. The water finger, thereby, provides a water conductive surface which assists the flow of water through the opening from the back surface of the trigger to the water receptacle. Conveniently, the water finger may have an enlarged head which extends slightly beyond the back surface of the trigger with the enlarged head serving to collect water for transmission through the opening.

To provide for freedom of movement between the trigger and the shielding means, the shielding means may include a recessed portion positioned in close proximity to the mounting member for the trigger. The shape and position of the recessed portion are such as to provide for free movement of the mounting member with respect to the recessed portion. For example, the mounting member may have an arcuate outer surface with the recessed portion of the shielding means having a correspondingly shaped arcuate inner surface.

If desired, the cup body may include an upwardly directed, outwardly flared skirt which effectively enlarges the upper area of the cup body and reduces water spillage during drinking by the birds. The shielding means may be connected to the skirt for support and, if desired, the shielding means and the skirt may be integral.

In reducing interference with the trigger movement or valve mechanism by debris falling into the cup, the trigger may be positioned within a recess at a sufficient distance from the back surface of the cup body to provide an opening between the trigger and the back surface. The opening is sufficiently large to permit the passage of dirt or debris into the cup without interference of the dirt or debris with the trigger movement. The cup body may include an inner surface which is inclined downwardly from the opening between the trigger and the back surface toward the low point defined in the cup body. Dirt or debris falling into the cup body is, thereby, conveyed along the inner surface to the low point of the cup body which is positioned out of the way of the trigger movement.

In another embodiment, the drinking cup may include a recess formed in the cup body with the trigger rotatably mounted in the recess. Shielding means may then be positioned above the recess to prevent access to the recess by dirt or debris. Also, the trigger may be shaped and positioned with respect to the recess to prevent the entry of dirt or debris into the recess during rotation of the trigger.

In still another embodiment of the invention, a poultry drinking cup is provided which has a clamp member that is shaped to fit about a pipe leading to an inlet opening to the cup in supporting the cup with respect to the pipe. The clamp member may include an opening which is expanded through resilient distortion of the clamp member in fitting the clamp member about the pipe to the inlet opening. THe clamp member may then resiliently contract to grip the pipe through contact between the pipe and an inner arcuate surface on the clamp member. In this manner, the drinking cup may be releasably secured to the pipe in a more convenient manner which eliminates the need for threaded fittings between the cup and pipe.

DESCRIPTION OF THE DRAWINGS

Turning to the drawings, which are merely illustrative of an embodiment of the invention:

FIG. 7 is a partial perspective view of a poultry drinking cup having an expandable clamp member secured to the exterior of the cup body for support of the drinking cup with respect to a pipe leading to the inlet opening of the cup;

FIG. 8 is a partial perspective view, similar to FIG. 7, with the clamp member positioned about a pipe leading to the inlet opening of the cup so as to support the drinking cup with respect to the pipe;

FIG. 9 is a side sectional view of an embodiment of a poultry drinking cup having a recess formed within the cup body with a trigger rotatably positioned within the recess and shielding means positioned to prevent the entry of dirt or debris into the recess;

FIG. 10 is a plan view of the drinking cup of FIG. 9;

FIG. 11 is a sectional view taken along line 11—11 of either FIG. 9 or FIG. 10 to illustrate the relative positions of the shielding means, the trigger housing formed integrally with the cup body, and a trigger rotatably positioned within a recess in the trigger housing, and FIG. 12 is a partial side sectional view, similar to FIG. 9, illustrating the position of the trigger within the recess during downward rotation of the trigger as it is pecked by the poultry so as to admit water into the cup body.

DETAILED DESCRIPTION

Figure 1:
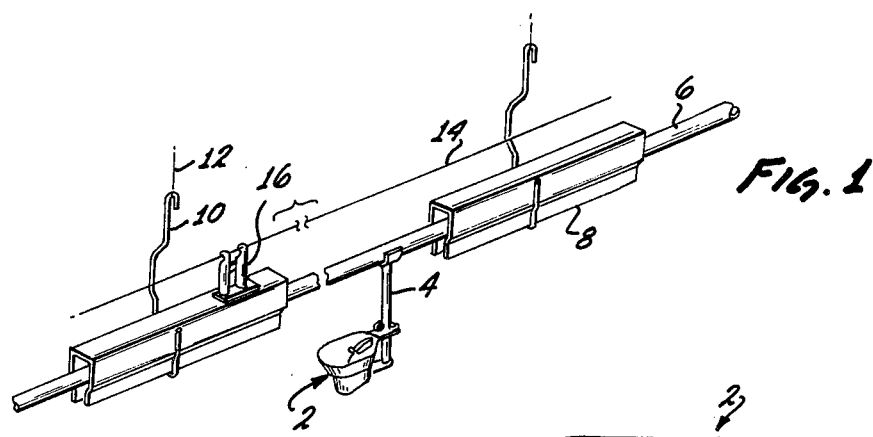
FIG. 1 is a pictorial representation of a poultry drinking cup supported near floor level through connection with a water pipe.

With reference to FIG. 1, a poultry drinking cup 2 is supported near floor or ground level through connection to a feed line fitting 4 which is in turn connected to a water line 6. The water line 6 may be positioned within a pipe support frame 8 to provide for expansion or contraction of the water line due to temperature changes. The pipe support frame 8 may, in turn, be supported through hangers 10 which partially surround the support frame and are connected at their upper ends to support wires 12. As shown, a shock wire 14 may be supported on the pipe support frame 8 by means of wire supports 16. The shock wire 14 provides a mild shock to poultry coming in contact with it and, thereby, serves to prevent the poultry from roosting on the pipe support frame 8.

Figure 2:
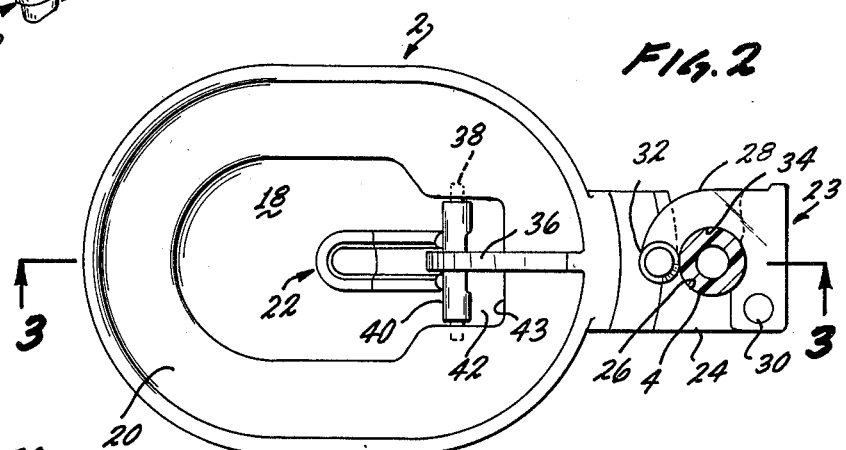
FIG. 2 is a top view of a poultry drinking cup of FIG. 1 illustrating the placement of shielding means in overlying relation to a portion of a trigger to shield the trigger movement from interference by dirt or debris which may fall into the drinking cup.

FIG. 2, which is a top view of the poultry drinking cup 2 of FIG. 1, illustrates the drinking cup as being formed from a cup body 18 which is joined to an upwardly directed outwardly flared skirt 20. A trigger, generally designated as 22, is rotatably mounted within the cup body while the poultry drinking cup 2 may be connected to the feed line fitting 4 through a snap fastener generally designated as 23 or by any other means such as a threaded connection between the cup 2 and fitting 4.

The snap fastener 23 includes a support plate 24 having a cavity 26 which engages the exterior surface of the feed line fitting 4. A latch member 28 is rotatably secured to the support plate 24 by means of a pivot 30. With the latch member 28 rotated to the position shown in FIG. 2, an end enlargement 32 contacts the exterior surface of the feed line fitting 4 while a curved surface 34 engages the surface of feed line fitting 4 to enclose the feed line fitting. The structural details of the snap fastener 23 do not form a part of the present invention and the snap fastener is completely described in my copending U.S. application, Ser. No. 342,387, filed Mar. 19, 1973, the disclosure of which is incorporated herein by reference.

The trigger 22 is rotatably mounted within the cup body 18 on a shaft 38 which extends into the cup body 18. A mounting member 40 on the trigger 22 is positioned about the shaft 38 with the trigger being free to rotate about the axis of the shaft. A shielding member 36, which may be formed integrally with the skirt 20, is positioned above the trigger 22 and partially overlies the mounting member 40. The function of the shielding member 36 in protecting the trigger 22 from interference by dirt or debris introduced into the drinking cup 2 will be described more fully hereinafter.

As shown, the axis of the shaft 38 is positioned a substantial distance from a back surface 43 of the cup body 18. The distance between the back surface 43 and the surface of the mounting member 40 defines a recess opening 42 between the mounting member and the back surface which is sufficient to permit the passage of dirt or debris into the cup body without interference with the movement of the trigger 22.

Figure 3:
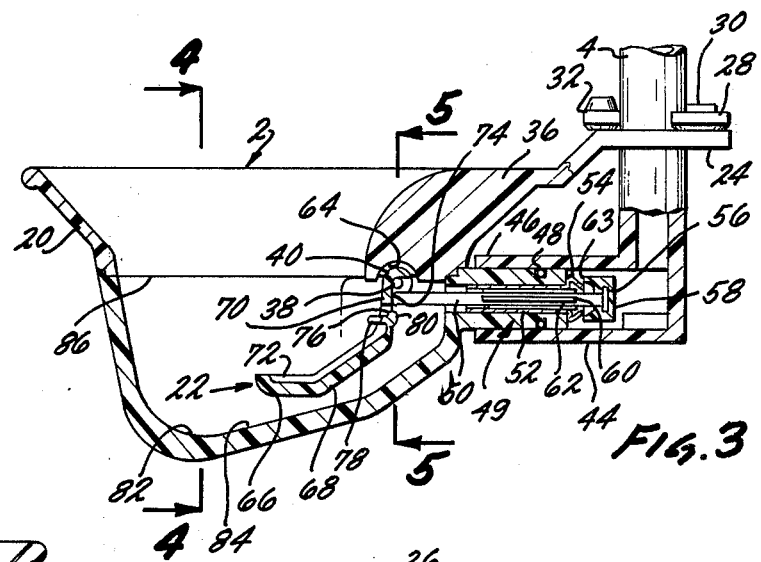
FIG. 3 is a side sectional view taken along the line 3—3 of FIG. 2 illustrating the structural details of the valve mechanism in an open position and the relationship of the valve mechanism with the trigger and the shielding means.

Turning to FIG. 3, which is a sectional view taken along line 3—3 of FIG. 2, the feed line fitting 4 is shown as being L-shaped to include a stub end 44 which is joined to a stub inlet 46 formed on the cup body 18. The stub inlet 46 is slidably secured in fluid-tight engagement with the stub end 44 through an O-ring 48 or other suitable sealing means. Water within the feed line fitting 4 is thereby conveyed through the stub inlet 46 into the cup body 18 with the water flow being regulated by a valve mechanism generally indicated as 49.

The valve mechanism 49 includes a valve stem 50 which is slidably received within a valve sleeve 52 that may be pressed within the interior of the stub inlet 46. The valve sleeve 52 includes a valve seat 54 defined at its outer end with the valve stem 50 being secured to a valve cap 58 through an enlargement 56. A plurality of guide ribs 60 are positioned axially along the exterior surface of the valve stem 50 in slidable engagement with the interior surface of the valve sleeve 52. Groove ways 62 are defined in the spacings between the guide ribs 60. With the valve mechanism 49 in an open position, as shown in FIG. 3, the valve cap 58 is moved away from the valve seat 54 to provide an opening 63 therebetween which admits water into the groove ways 62 for passage along the valve stem 50 and into the cup body 18.

The shielding member 36 overlies both the valve stem 50 and its point of contact with the back surface 74 of the trigger 22 to prevent dirt or debris from coming into contact with the valve stem 50 and to thereby impede or clog the movement of the valve mechanism 49. A recess 64 is provided within the shielding member 36 which lies in close proximity to the exterior surface of the mounting member 40. As illustrated, the exterior surface of the mounting member 40 may be arcuately shaped while the surface fo the recess 64 may have an arcuate shape corresponding to that of the mounting member.

The trigger 22 includes a lower leg portion 66 joined to a central leg portion 68 which is in turn joined to an upper leg portion 70. A water receptacle 72 is defined by the front surface of the trigger 22 with the back surface 74 of the trigger, as described, contacting the inner end of the valve stem 50.

During usage of the drinking cup 2, water which flows through the valve mechanism 49 will flow, to some extent, along the surface of the valve stem 50 into contact with the back surface 74. An opening 76 is provided in the trigger 22 which defines a passage leading to the water receptacle 72. A water finger 78 may be positioned within the opening 76 with the finger having ends which extend beyond the front and back surfaces of the trigger. An enlarged head 80 may be defined on the rear end of the finger 78 with the enlarged head extending beyond the back surface 74 of the trigger 22. Water which is conveyed along the valve stem 50, thus, contacts the back surface 74 and then flows downwardly into contact with the water finger 78. The enlarged head 80 of the water finger 78 serves to collect water which flows down the back surface 74, after which the collected water is conveyed along the exterior surface of the water finger 78 to its inner end where the water falls into the water receptacle 72.

As stated previously, the drinking cup 2 may be used by poultry for obtaining water on demand. To assist the poultry in learning to drink, the water within the receptacle 72 serves as a lure which causes the poultry to strike at the trigger 22 with their beaks. On striking the trigger 22, the valve mechanism 49 is actuated to admit water into the cup body 18. Some of the water flowing into the cup 2 flows along the surface of the valve stem 50, and then along the surface of the water finger 78 into the water receptacle 72. This renews the water supply within the receptacle 72, which, thereby, continues to serve as a lure for poultry using the drinking cup 2.

An inner surface 84 of the cup body 18 slopes downwardly from the recess opening 42, as shown in FIG. 2, to a low point 82 within the cup body. The low point 82 is positioned forwardly of the trigger 22 and out of the path of movement of the trigger. Thus, dirt or debris which falls into the cup body 18 is conveyed along the inner surface 84 to the low point 82 where it does not interfere with the movement of the trigger 22. The poultry drinking cup 2 can, thus, accommodate a relatively large amount of dirt or debris which may accumulate in the cup without interference with the valve mechanism 49 or the movement of the trigger 22.

Also, the location of the low point 82 makes it relatively easy for a workman to remove dirt or debris from the cup body 18. Since the low point 82 is positioned forwardly and away from the trigger 22, dirt or debris may be removed readily merely by inserting a finger into the low point 82 and then lifting upwardly to move the dirt or debris up the interior wall of the cup body 18 and over the skirt 20.

The cup body 18 and skirt 20 may be joined together, as discussed previously, along a jointure line which is indicated as 86. The cup body 18 may be formed of plastic which is preferably reinforced with fiberglass to strengthen the body against breakage by the poultry and the skirt 20 may also be formed of plastic. The cup body 18 and skirt 20 may be joined together by any suitable means such as sonic welding.

Figure 4:
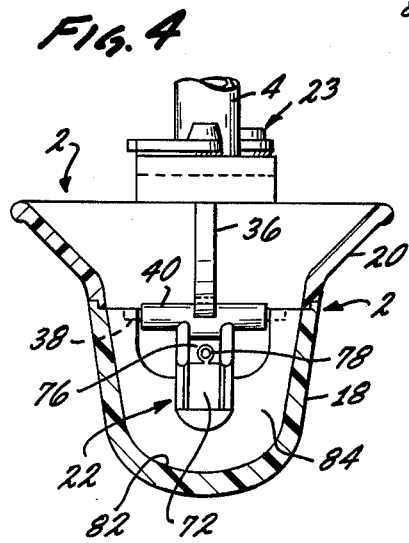
FIG. 4 is a sectional view taken along the line 4—4 of FIG. 3 illustrating the manner in which the trigger may be positioned between the side walls of the cup body.

FIG. 4, which is a sectional view along line 4—4 of FIG. 3, illustrates the axial placement of the trigger 22 with respect to the cup body 18. As shown, the shielding member 36 is also positioned along the axis of the cup body 18 to shield the valve stem 50 and the point of contact of the valve stem with the trigger 22 from interference by dirt or debris which may fall into the poultry drinking cup 2.

Figure 5:
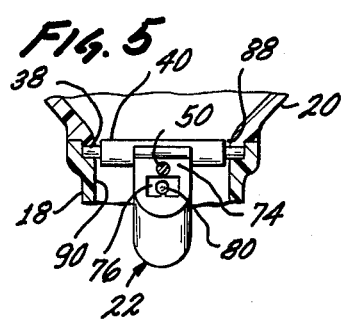
FIG. 5 is a partial sectional view taken along the line 5—5 of FIG. 3 illustrating a water finger positioned within an opening leading from the back surface of the trigger to a water receptacle defined by the front surface of the trigger.

FIG. 5 is an enlarged partial sectional view taken along line 5—5 of FIG. 3 which illustrates the relationship between the valve stem 50, the opening 76, and the enlarged head 80 on the water finger 78. As shown, the end of the valve stem 50 contacts the back surface 74 of the trigger 22 at a point which is spaced slightly above the opening 76 while the enlarged head 80 is positioned within the opening. Water which is conveyed along the outer surface of the valve stem 50, thus, flows from the valve stem onto the back surface 74 and then flows onto the surface of enlarged head 80 and the surface of the water finger 78. The water then flows, being aided by flow along the surface of the water finger 78, through the opening 76 and into the water receptacle 72. This maintains a supply of water within the receptacle 72 to lure poultry into striking the trigger 22 and, thereby, admitting water into the drinking cup 2.

The mounting member 40 which is pivotally positioned on the shaft 38, as described previously, has ends 88 which are positioned in close proximity to the cup sidewalls 90. The length of the mounting member 40 serves to centrally position the trigger 22 between the sidewalls 90 and in proper relation to the valve stem 50. When the trigger 22 is so positioned, the water receptacle 72 may receive water through the opening 76 in the manner described previously.

Figure 6:
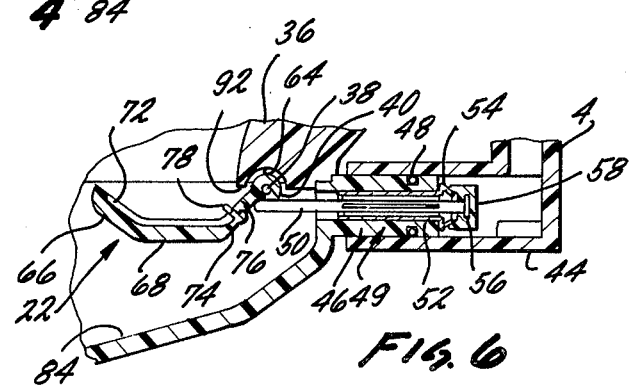
FIG. 6 is a side sectional view, similar to FIG. 3, illustrating the position of the trigger when the valve mechanism is in a closed position due to the effect of water pressure.

FIG. 6 is a side sectional view, similar to FIG. 3, showing the position of the trigger 22 when the valve mechanism 49 is in a closed position. With the valve mechanism 49 in a closed position, the valve cap 58 is pressed against the valve seat 54 by water pressure within the feed line fitting 4 and the valve stem 50 is moved to the left from its position as shown in FIG. 3. This causes the trigger 22 to rotate in a clockwise direction from its position shown in FIG. 3 such that the central leg portion 68 of the trigger assumes a relatively horizontal position. The recess 64 within shielding member 36 terminates at a lip surface 92 which is positioned adjacent the trigger 22 in its position shown in FIG. 6. The lip surface 92 serves as a stop to prevent continued clockwise rotation of the trigger 22.

In another aspect of the invention, shown in partial perspective view in FIG. 7, a poultry drinking cup 94 may be connected to a water feed line or feed line fitting, such as fitting 96, through a resilient clamp member 102. The fitting 96 may include a horizontal pipe leg 98 and a vertical pipe leg 100 with the clamp member 102 engaging the vertical pipe leg in securing the drinking cup to the fitting.

The clamp member 102 includes an arcuate inner surface 104 and an expandable opening 106. An opening member 107, which may be formed integrally with clamp member 102, extends outwardly from the clamp member to define an opening surface 108. The clamp member 102 may be secured to the drinking cup 94 by means of a downwardly extending rib 109 with rotation of fitting 96 in the direction 110 bringing vertical pipe 100 into contact with opening surface 108. On continued rotation of fitting 96, the vertical pipe 100 slides relative to opening surface 108 to transmit an opening force to the clamp memer 102 which expands the opening 106. The vertical pipe 100 may then move through opening 106 and into contact with arcuate inner surface 104. After passage of vertical pipe 100 through the opening 106, the opening then contracts with the vertical pipe tightly gripped by the clamp member 102 through contact between the vertical pipe and arcuate inner surface 104.

The direction of rotation indicated by arrow 110 is not intended to imply that the fitting 96 must necessarily be rotated relative to clamp member 102. In fact, the more usual situation during installation of a drinking cup 94 will involve rotation of the drinking cup relative to a fitting, such as fitting 96, which is fixed in its position. Accordingly, the arrow 110 merely indicates relative movement between the drinking cup 94 and fitting 96.

An enlarging member 112 which extends outwardly from clamp member 102 may be utilized to enlarge the opening 106 during removal of drinking cup 94 from the fitting 96. In enlarging the opening 106, a force may be applied to the enlarging member 112 along the direction of the arrow 111.

After rotation of the fitting 96 in the direction of arrow 110, the vertical pipe 100 is engaged by the clamp member 102. FIG. 8 illustrates the position of the drinking cup 94 as held by the clamp member 102 through engagement with vertical pipe 100.

A quick-disconnect clamp structure, as described in FIGS. 7 and 8, provides support for a poultry drinking cup which avoids the drawbacks of previous drinking cups in which the drinking cup was secured to a pipe through a threaded fitting. By using the present clamp structure, the time required for installation or replacement of drinking cups has been greatly reduced. In addition, the clamp structure provides positive positioning of a drinking cup in predetermined relation to a pipe or feed line fitting. This result is not consistently obtainable with a threaded connection where thread wear or an imperfection in the threads will result in positioning the cup at an angle to the vertical after the cup is threadedly connected to the feed line fitting. Since poultry drinking cups and feed line fittings are commonly made from relatively soft plastic, threads which are used in securing the cup to a fitting may easily become damaged which may make the drinking cup unusable.

In a further embodiment shown in FIGS. 9–12, a poultry drinking cup 114 is illustrated which may be used near floor level where dirt or debris may interfere with the functioning of a drinking cup. As shown in side sectional view in FIG. 9, a cup body 116 includes an outwardly flared upwardly extending skirt 118 which is joined to the cup body along a line of jointure 120. The line of jointure 120 may be formed in any convenient manner, such as by sonic welding, and the cup body 116 and skirt 118 may be formed of plastic and may be reinforced with fiberglass.

The cup body 116 may provide an inner cavity 122 for containing water and a trigger housing 123 which defines a recess 124. A trigger 126 is rotatably positioned within recess 124 and a water receptacle 128 formed on the front surface of the trigger 126 includes a lower arcuate surface 130. The trigger 126 has a back surface 132 and a water opening 134 leading from the back surface into receptacle 128.

The trigger 126 may also include an arcuate lower surface 136 which is complementary to an arcuate surface 138 in recess 124. The trigger 126 is rotatably supported on a shaft 140 and a shielding member 142 is positioned above the recess 124. An arcuate surface 144 formed on the underside of shielding member 142 is in overlying relation to a complementary curved upper surface 146 on trigger 126. The length of the arcuate lower surface 136 is sufficiently long to position a portion of the lower surface in closely spaced complementary relation to the surface 138 during rotation of the trigger 126.

The closely spaced relation of trigger 126 with respect to the walls of recess 124 during movement of the trigger to any position prevents the entry of dirt or debris from the cavity 122 into the recess 124. Also, a low point 147 in cavity 122 is positioned below a point 149 where the recess 124 and cavity merge. Thus, dirt or debris within the cavity 122 will collect at low point 147 and will not interfere with the movement of trigger 126 or have access into the recess 124. As water enters the recess 124, as will be described, the water may flow through openings between the surfaces of the trigger 126 and the walls of recess 124. This provides a flushing action which tends to keep the recess 124 clear of dirt or debris and free from bacterial contamination.

The drinking cup 114 includes a stub inlet 148 which is positioned within a horizontal pipe leg 98 through a seal arrangement in the same general manner as described with regard to drinking cup 2 in FIGS. 3 and 6 of the drawings. For ease in description, the feed line fitting lead to drinking cup 114 is shown as the feed line fitting 96 described in FIGS. 7 and 8. Further, the clamp member 102 described in FIGS. 7 and 8 is illustrated as the means for connecting drinking cup 114 to feed line fitting 96.

It should be emphasized, however, that the drinking cup 114 shown in FIGS. 9–12 may be used with feed line fittings which differ from fitting 96. Also, drinking cup 114 may be supported in any manner and does not require the use of a clamping structure exemplified by the clamp member 102. Thus, for example, drinking cup 114 may be secured to a feed line fitting in any suitable manner, such as by use of a threaded connection.

A valve means 150 of the same general type as valve means 49 described in FIGS. 3 and 6 is positioned within the stub inlet 148 and is connected to a valve stem 152 which bears against an indentation 154 in back surface 132 of trigger 126. In the position of the trigger 126 shown in FIG. 9, the valve means 150 is closed and water may not enter the recess 124. Under these conditions, the trigger 126 extends out into the drinking cup cavity 122. The water within receptacle 128 acts as a lure to poultry and when poultry strike at the water in the receptacle and contact the trigger 126, the trigger is rotated in a counter clockwise direction from its position shown in FIG. 9. This opens the valve means 150 and permits the flow of water into the recess 124. As water flows into recess 124, the water may flow along valve stem 152 and into contact with the back surface 132 of trigger 126. A portion of the water may flow downwardly through opening 134 and into the reservoir 128.

The appearance of the drinking cup 114 is shown in plan view in FIG. 10. As illustrated, the shielding means 142 has a width which overlies the recess 124 to prevent dirt or debris from falling into the recess. The shielding means 142 may be formed integrally with cup body 114 and trigger housing 123. Conversely, the shielding means 142 may be formed as a separate member which is secured in any suitable manner to the drinking cup 114 and trigger housing 123. When shielding means 142 is formed as a separate member, this permits the removal of the shielding means for access to the recess 124.

As illustrated in FIG. 10, the shielding means 142 and trigger housing 123 are integral. Thus, a slant inner surface 151 on shielding means 142 (see also FIG, 9) forms the inner wall surfaces of trigger housing 123 which extend into cavity 122. Also, the rib 109 is shown as being relatively thin. Thus, the rib 109 has a narrow upper surface 153 which tends to prevent poultry from perching on the rib.

FIG. 11 is a sectional view taken along line 11—11 of either FIGS. 9 or 10 which discloses the relatively close positioning of the surfaces of trigger 126 with respect to the walls of recess 124. The section line 11—11 passes through the trigger housing 123 at a point which is forward of a portion of the trigger 126. To indicate the position of the trigger 126, the trigger portions which are behind section line 11—11 are shown in phantom line drawing.

The closely spaced relation between trigger 126 and recess 124 is indicated by the narrow spacing between inner sidewalls 156 of the trigger housing 123 and side surfaces 158 of the trigger. Also, as indicated, the shaft 140 which supports the trigger 126 may be positioned in any suitable manner between walls 156 of the trigger housing 123.

FIG. 12 is a side sectional view, similar to FIG. 9, showing the position of trigger 126 after inward rotation during opening of the valve means 150. On inward rotation of trigger 126, the back surface 132 of the trigger may strike the rear surface 166 of recess 124 which limits the degree of inward trigger rotation. With trigger 126 rotated to its innermost position, a portion of the curved upper surface 146 is still in closely positioned contiguous relation to the arcuate surface 144 to prevent entry of dirt or debris into the recess.

As shown, a stop member 160 extends inwardly from the arcuate surface 144. A groove 162 formed in the upper curved surface 146 terminates at a shoulder 164. The stop member 160 and groove 162 are aligned such that rotation of the trigger 126 in a clockwise direction from its position in FIG. 12 moves the groove 162 onto the fixed stop member 160. On continued clockwise rotation of trigger 126, the stop member 160 contacts the shoulder 164 which, thereby, limits the degree of upward clockwise rotation of the trigger.

As described, the rotation of trigger 126 is limited so that surfaces of the trigger, irrespective of its position, are positioned in closely spaced relation to the walls of recess 124 to prevent the entry of dirt or debris into the recess. Water entering the recess 124 may, however, flow through the spaces between the surfaces of trigger 126 and the walls of recess 124. This provides flushing of the recess 124 to keep the recess clean and to prevent growth of bacteria therein.

As described, the poultry drinking cup of the invention may be used near floor level where dirt or debris generally presents the biggest problem. However, the poultry drinking cup may be used in any location where dirt or debris are causing problems, e.g., the cups may be positioned along the front of poultry cages or adjacent openings in partitions between poultry cages.

Also, the use of a water finger to assist the flow of water to a water receptacle in the trigger may be employed in any type of poultry drinking cup in accord with the present invention.

I claim:

1. A poultry drinking cup comprising:
a cup body having an inlet opening;
means to connect said inlet opening to a water source;
valve means positioned to control the flow of water through said inlet opening into said cup body;
a trigger rotatably positioned within said cup body in operative connection with said valve means with movement of the trigger providing movement of the valve means to admit water into the cup body;
said cup body including a recess having an unobstructed top opening and said trigger being rotatably positioned within said recess;
a mounting for said trigger within said recess;
a mounting member carried by said trigger in engagement with said mounting;
said mounting member having ends in close proximity to sidewalls of said recess with the mounting member centrally positioning said trigger within said recess;
a movable valve stem for actuation of said valve means;
said stem having an inner end in engagement with said trigger with rotational movement of said trigger causing axial movement of said valve stem;
said recess having a back wall surface and a bottom surface with the back wall surface being spaced a sufficient distance from said trigger to permit debris falling into said top opening to pass between said back wall surface and said trigger;
said cup having a low point therein with said low point being spaced forwardly of said trigger such that debris collecting at said low point does not interfere with rotational movement of said trigger;
the bottom surface of said recess sloping downwardly toward said low point;
shielding means partially covering the unobstructed top opening into said recess with the shielding means being shaped and positioned to cover said valve stem and the point of engagement of said valve stem with said trigger, and
said trigger being shaped to provide sufficient clearance between the trigger and the sloping bottom surface of said recess to permit debris to pass beneath the trigger to the low point in said cup body when said valve means is in a closed position,
whereby debris falling into said recess may pass between said trigger and the back wall of said recess without contacting said valve stem and the point of engagement of the valve stem with said trigger with such debris then being conveyed along said sloping bottom surface beneath the trigger to the low point of said cup body.

2. The poultry drinking cup of claim 1 including:
a back surface on said trigger;
a water receptacle formed in the front surface of the trigger, and
an opening through the trigger forming a passage between the back surface and the water receptacle,
whereby water conveyed to the trigger along said valve stem is conducted through the opening into the receptacle.

3. The poultry drinking cup of claim 1 wherein said shielding means includes a recessed portion positioned in close proximity to said mounting member with the shape and position of the recessed portion providing an unobstructed region between the shielding means and mounting member to permit free movement of the mounting member with respect to the recessed portion.

4. The poultry drinking cup of claim 3 wherein said mounting member has an arcuate outer surface and said recessed portion has a correspondingly shaped arcuate inner surface.

5. The poultry drinking cup of claim 1 including:
an upwardly-directed, outwardly-flared skirt on said cup body, and
said shielding means being connected to said skirt.

6. The poultry drinking cup of claim 5 wherein said shielding means and said skirt are integral.

7. The poultry drinking cup of claim 1 wherein said stop means is positioned between said trigger and said shielding means to limit upward rotational movement of said trigger with respect to said cup body.

8. The poultry drinking cup of claim 1 including stop means positioned to limit the degree of rotational movement of said trigger in a direction away from the back wall surface of said recess.

9. A poultry drinking cup comprising:
a cup body having an inlet opening;
means to connect said inlet opening to a water source;
valve means positioned to control the flow of water through said inlet opening into said cup body;
a trigger rotatably positioned within said cup body in operative connection with said valve means with movement of the trigger providing movement of the valve means to admit water into the cup body;
shielding means positioned relative to the cup body with said shielding means being shaped and positioned to shield the trigger and valve means from interference by dirt and debris;
a recess formed in said cup body;
said trigger being rotatably positioned within said recess;
said trigger having sidewalls positioned closely adjacent to sidewalls of said recess, and
said shielding means positioned in overlying relation to said recess,
whereby the movement of said trigger within said recess is shielded from dirt and debris.

10. The poultry drinking cup of claim 9 including:
an arcuate lower surface in said recess, and
an arcuate lower surface on said trigger which is closely adjacent to said lower surface in said recess,
whereby the arcuate lower surface of said trigger remains closely adjacent to the lower surface of the recess during rotation of said trigger with respect to said cup body.

11. The poultry drinking cup of claim 9 including:
a water receptacle formed in a front surface of the trigger;

an opening through the trigger between the front surface and a back surface of the trigger;

a movable valve stem for actuation of said valve means, and said valve stem positioned within said recess and having an inner end engaging said trigger at a point above said opening, whereby water conveyed to the trigger along said valve stem is free to contact the back surface of the trigger and to flow through said opening and into said water receptacle.

12. The poultry drinking cup of claim 11 wherein said receptacle has a curved lower surface.

13. The poultry drinking cup of claim 10 wherein said arcuate lower surface on said trigger has an arcuate length which is sufficient to maintain at least a portion of said lower trigger surface in close relation to said lower recess surface during rotation of said trigger with respect to said cup body.

14. The poultry drinking cup of claim 9 including stop means positioned to limit the degree of rotational movement of said trigger.

15. The poultry drinking cup of claim 9 including an arcuate recess formed in the undersurface of said shielding means;

an upper surface on said trigger;

said upper surface having a curvature which is complementary to the curvature of said arcuate recess, and said upper surface having a length which is sufficient to maintain at least a portion of said upper surface in contiguous relation to said arcuate recess during rotational movement of said trigger with respect to said cup body.

16. The poultry drinking cup of claim 15 including stop means positioned to limit the degree of rotational movement of said trigger.

17. The poultry drinking cup of claim 16 wherein said stop means is positioned between said trigger and said shielding means.

18. The poultry drinking cup of claim 16 wherein said stop means comprises an arcuate groove in said upper surface;

said arcuate groove having a shoulder at one end and being open at its other end;

a stop member projecting from said arcuate recess in alignment with said groove, whereby rotation of said trigger in an upward direction is limited by engagement of said stop member with said shoulder.

19. A poultry drinking cup including a cup body, an inlet opening to the cup body, valve means positioned to control the flow of water through said inlet opening, a trigger rotatably mounted within the cup body, and a movable valve stem for actuation of the valve means with said valve stem engaging a first surface of said trigger, the improvement comprising:

a water receptacle formed by a second surface of said trigger;

an opening through the trigger forming a passage between the first and second surfaces;

a water finger positioned within said opening, and said water finger being shaped to collect water on said first surface and to provide a water conductive surface to convey the collected water through said opening into said water receptacle on said second surface, whereby water conveyed to the trigger along said valve stem contacts said first surface and flows through said opening into the water receptacle formed by said second surface.

20. The poultry drinking cup of claim 19 including outer projections on said water finger which extend beyond the first and second surfaces of the trigger.

21. The poultry drinking cup of claim 20 including an enlarged head on said water finger which extends outwardly of said first surface.

22. A poultry drinking cup comprising:

a cup body having an inlet opening;

means to connect said inlet opening to a water source;

valve means positioned to control the flow of water through said inlet opening into said cup body;

a trigger rotatably positioned within said cup body in operative connection with said valve means with movement of the trigger providing movement of the valve means to admit water into the cup body;

said cup body including a recess having a top opening and said trigger being rotatably positioned within said recess;

a mounting for said trigger within said recess;

a mounting member carried by said trigger in engagement with said mounting;

said mounting member having ends in close proximity to sidewalls of said recess wth the mounting member centrally positioning said trigger within said recess;

a movable valve stem for actuation of said valve means;

said stem having an inner end in engagement with said trigger with rotational movement of said trigger causing axial movement of said valve stem;

said recess having a back wall surface and a bottom surface with the back wall surface being spaced a sufficient distance from the trigger to permit debris falling into said top opening to pass between said back wall surface and said trigger;

said cup body having a low point therein with said low point being positioned forwardly of said trigger such that debris collecting at said lower point does not interfere with the rotational movement of said trigger;

the bottom surface of said recess sloping downwardly toward said low point;

shielding means partially covering the top opening into said recess with the shielding means being shaped and positioned to cover said valve stem and the point of engagement of said valve stem with said trigger;

a back surface on said trigger;

a water receptacle formed in the front surface of said trigger;

an opening through the trigger forming a passage between the back surface and the water receptacle;

a water finger positioned within said passage with the water finger providing a water conductive surface for water passing through said passage, and said trigger being shaped to provide sufficient clearance between the trigger and the sloping bottom surface of said recess to permit debris to pass beneath the trigger to the low point in said cup body when said valve means is in a closed position, whereby debris falling into the top opening in said recess may pass between said trigger and the back wall of said recess without contacting said valve stem and the point of engagement of the valve stem with said trigger after such debris is then conveyed along said sloping bottom surface beneath said trigger to the low point of said cup body.

23. The poultry drinking cup of claim 22 wherein said finger has an enlarged head which extends beyond the back surface of the trigger.

24. In a poultry drinking cup having a cup body, an inlet opening, valve means to control the flow of water through said inlet opening into said cup body and means to connect said inlet opening to a water source, the improvement comprising:
a unitary clamp member secured to said cup body;
said clamp member having an unbroken inner acuate surface which defines a generally cylindrical cavity having an opening;
said cup body having a vertical axis;
said cylindrical cavity and said opening being in general alignment with said vertical axis; and
said clamp member being sufficiently resilient to permit enlargement of said opening by distortion of the clamp member to fit said generally cylindrical cavity about a vertically positioned support member with the clamp member then returning to its undistorted state to grip the support member with said inner arcuate surface,
whereby the poultry drinking cup is supported in a generally vertical position with said vertical axis in general alignment with the vertical support member.

25. The poultry drinking cup of claim 24 wherein said vertically positioned support member is a vertically positioned pipe leading to said inlet opening, and
said generally cylindrical cavity is in alignment with said inlet opening.

26. The poultry drinking cup of claim 24 including
an opening member extending generally radially outwardly from said clamp member;
an opening surface defined by said opening member, and
said opening surface being shaped and positioned to contact the support member and to guide the support member into said opening while enlarging said opening as the poultry drinking cup is positioned in a generally vertical position with said clamp member in supported engagement with the support member.

27. The poultry drinking cup of claim 25 including
an opening member extending generally radially outwardly from said clamp member;
an opening surface defined by said opening member, and
said opening surface being shaped and positioned to contact the vertically positioned pipe leading to said inlet opening and to guide the pipe into said opening while enlarging said opening as the poultry drinking cup is positioned in a generally vertical position with said clamp in supported engagement with the vertically positioned pipe.

28. The poultry drinking cup of claim 26 including
an opening enlarging member extending generally radially outwardly from said clamp member;
an opening enlarging surface defined by said opening enlarging member, and
said opening enlarging member being shaped and positioned to provide an enlarging force to said clamp opening and said generally cylindrical cavity when a force is applied to said opening enlarging surface such that the support member can then be withdrawn from said cavity through said clamp opening.

29. The poultry drinking cup of claim 27 including
an opening enlarging member extending generally radially outwardly from said clamp member;
an opening enlarging surface defined by said opening enlarging member, and
said opening enlarging member being shaped and positioned to provide an enlarging force to said clamp opening and said generally cylindrical cavity when a force is applied to said opening enlarging surface such that the vertically positioned pipe can then be withdrawn from said cavity through said clamp opening.

* * * * *